United States Patent [19]
Hiyama et al.

[11] Patent Number: 6,122,465
[45] Date of Patent: Sep. 19, 2000

[54] REFLECTIVE LIQUID CRYSTAL DISPLAY HAVING A HOLOGRAM COLOR FILTER

[75] Inventors: Ikuo Hiyama, Hitachi; Akira Arimoto, Kodaira; Masato Shimura, Mobara, all of Japan

[73] Assignee: Hitachi, Ltd., Tokyo, Japan

[21] Appl. No.: 08/401,692

[22] Filed: Mar. 10, 1995

[30] Foreign Application Priority Data

Mar. 16, 1994 [JP] Japan ................................ 6-045366

[51] Int. Cl.[7] .................................................. G02F 1/1335
[52] U.S. Cl. ............................ 399/106; 349/113; 359/15
[58] Field of Search ................................. 359/9, 15, 68, 359/40, 42, 70; 349/106, 5, 113

[56] References Cited

U.S. PATENT DOCUMENTS

| | | | |
|---|---|---|---|
| 4,686,519 | 8/1987 | Yoshida et al. | 340/701 |
| 5,442,467 | 8/1995 | Silverstein et al. | 359/69 |
| 5,506,701 | 4/1996 | Ichikawa | 359/15 |
| 5,526,145 | 6/1996 | Weber | 359/68 |

FOREIGN PATENT DOCUMENTS

| | | | |
|---|---|---|---|
| 55-110217 | 8/1980 | Japan | 359/42 |
| 5-196958 | 8/1993 | Japan | 359/42 |

*Primary Examiner*—William L. Sikes
*Assistant Examiner*—Charles Miller
*Attorney, Agent, or Firm*—Antonelli, Terry, Stout & Kraus, LLP

[57] ABSTRACT

A color liquid crystal display device includes a liquid crystal element, an optical path conversion element array and a hologram. The liquid crystal element has a blue pixel B, a red pixel R, and a green pixel G, which are arranged plainly, and a liquid crystal layer. The optical path conversion element array converts external light into approximately parallel light. The hologram separates light from the optical path conversion element array into a light having a wavelength range of the three primary colors and irradiates pixels R, G and B corresponding to the liquid crystal element.

4 Claims, 14 Drawing Sheets

REFLECTIVE LIQUID CRYSTAL DISPLAY HAVING A HOLOGRAM COLOR FILTER

BACKGROUND OF THE INVENTION

The present invention relates to a color liquid crystal display device, and more particularly to a color liquid crystal display device having a bright display screen.

Conventional transmissive type color liquid crystal display devices have a pair of transparent glass substrates and a liquid crystal layer sandwiched between the glass substrates. Transparent electrodes are formed on one surface of the transparent substrates and polarizers are disposed on the other surface of the substrates. The transparent glass substrates are arranged to form a gap between the encountered surfaces. A liquid crystal layer is sandwiched between the substrates within the gap. A color filter and a black matrix are superposed between the transparent electrode and the transparent glass substrate on the side of the substrate where light is emitted. A back light is disposed outside of the transparent glass substrate where light enters. A transparent electrode which controls impinging light is controlled by applying a voltage that is determined by an image signal applied between the transparent electrodes. In other words, color filters for green, blue and red are arranged in a plane to effect color display by adjustment of the transmitting light.

In reflection type color liquid crystal display devices, a reflecting mirror is disposed on a polarizer opposite to the face where the back light of the transmissive color liquid crystal display device is arranged. (Japanese patent laid-open No. 4-212124).

SUMMARY OF THE INVENTION

In conventional color liquid crystal display devices, to achieve color indication, a color filter that is divided into three segments in a plane is disposed on the side of the liquid crystal layer of the glass substrate. Thus, since a color display is effected by controlling transmitting light for each pixel, the color filter transmits only red, green and blue portions of the white light. For this reason, only about 33% of incident light is utilized in theory when maximum display is attempted. Accordingly, in transmissive color liquid display devices, it is necessary to enlarge the capacity of the back light so as to make the screen brighter, which leads to a problem that the consumption of electricity by the liquid crystal display device becomes large.

On the other hand, there is a problem in reflective liquid display devices that the display screen becomes darker because of great light loss by passing light twice through the color filter, in addition to light loss due to the plane division of the color filter similar to the transmissive color liquid crystal display devices. Because a diffusion reflection plate (diffused reflector) is used for preventing direct reflection, which results in a lowering of the reflection rate, there is an undesirable decrease in brightness. Direct reflection is defined as a phenomenon in which other things than image information, such as surrounding objects, persons, etc., which reflect on the glass substrate or the reflector, are observed by a viewer. An object of this invention is to provide an improved color liquid crystal display device which eliminates the problems mentioned above. More specifically, it is an object to provide an improved color liquid crystal display device having a bright display screen. Other objects of this invention will become clear from the following explanations of various exemplary embodiments. According to an aspect of this invention, a color liquid crystal display device comprises a plurality of liquid crystal display devices, first means for converting white light into substantially parallel light, and second means for dispersing the light from the first means into three light portions and for irradiating the pixels with the dispersed light portions.

The first means has a plane form as a whole. A proper example is a light path conversion element comprising multiple core portions of high refractive index, the core portions extending perpendicularly to the plane of the plate, cladding portions of low refractive index, the cladding portions surrounding the cores, and lens portions disposed at outlets of the cores.

As the second means, a hologram is proper. The hologram is arranged in accordance with each of the pixels, or with plural color pixels constituting pixels.

As the hologram, plane holograms or volume holograms can be used. Phase type, absorption type or complex amplitude type holograms also can be used.

By this arrangement, there is no light absorption due to a color filter of the type used in the conventional display device, because no such color filter is employed. Rather, in accordance with this invention, light is divided by the second means and the light impinges on each of the pixels. All of the light impinging on the liquid crystal display element is irradiated onto the screen, so that a bright color liquid crystal display device is realized. In the conventional color liquid display devices, $2/3$ of the light which has impinged on the color filters is absorbed in the color filters. But, according to this invention, a color liquid crystal display device having a brightness of approximately 3 times that of the conventional devices can be realized.

DESCRIPTION OF THE PREFERRED EMBODIMENTS

The examples of the present invention will be now described in detail by reference to the drawings.

Figure 1:
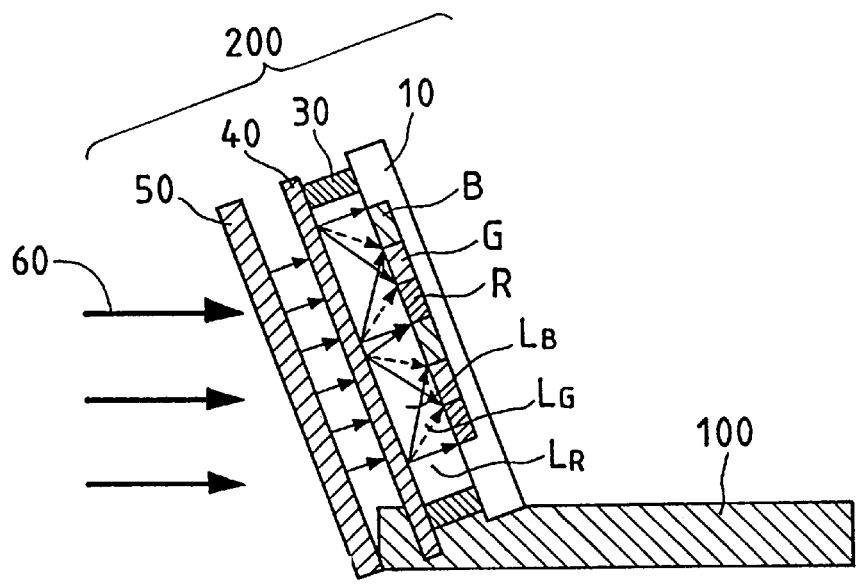
FIG. 1 is a schematic cross sectional view which shows an example of a transmissive color liquid crystal display device to which this invention is applied.

FIG. 1 shows an example of a transmissive color liquid crystal display device to which this invention is applied. In the figure, 100 represents a personal computer main unit, and 200 represents the transmissive color liquid crystal display device, which is supported by the personal computer main unit 100. Transmissive color liquid crystal display device 200 is composed of liquid crystal element 10, hologram 40 and optical path conversion element array 50.

As will be described later, liquid crystal element 10 is composed by arranging blue pixels B, green pixels G and red pixels R in a plane. Hologram 40 is positioned at the rear side of liquid crystal element 10 and is supported through use of a spacer 30. Optical path conversion element array 50 is arranged behind hologram 40. Optical path conversion element array 50 has the function to transform incident light into approximately parallel light. Hologram 40 disperses the parallel light that comes from optical path conversion element array 50 to form blue light LB, green light LG and red light LR. Each pixel is irradiated with the dispersed light, blue pixel B with blue light LB, green pixel G with green light LG, and red pixel R with red light LR. Reference numeral 60 indicates the light that is directed onto the back side of optical path conversion element array 50.

By this structure, the brightness of the LCD becomes one third. The light that is irradiated onto each pixel is spread over three times the area, and the light disperses. The area of each pixel becomes one third of the former area. Therefore, the quantity of light per unit area becomes the same as the incident light. Because the brightness of the pixel becomes three times the brightness of a conventional device, a bright display can be realized.

Figure 2:
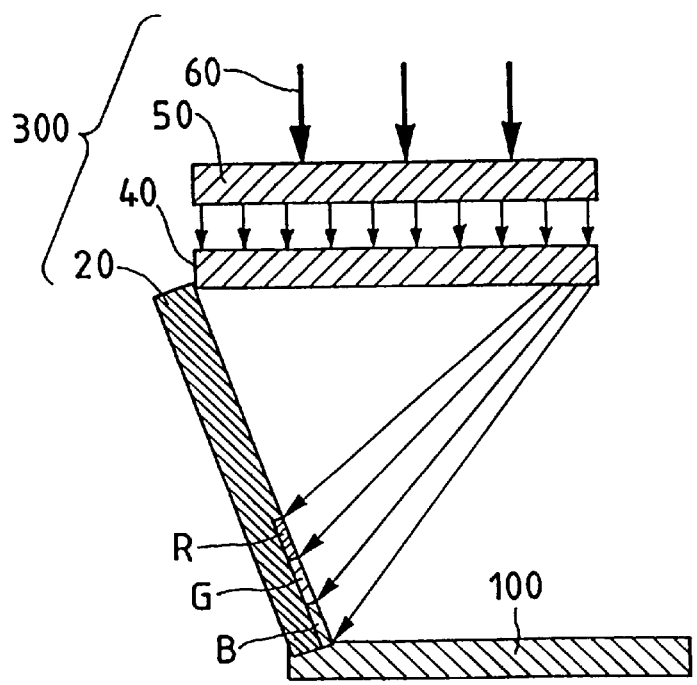
FIG. 2 is a schematic cross sectional view which shows an example of a reflective color liquid crystal display device to which this invention is applied.

FIG. 2 shows a schematic sectional view of a reflective color liquid crystal display device to which the present invention is applied. In the figure, 100 represents the personal computer main unit, and 300 represents the reflective color liquid crystal display device supported by the personal computer main unit 100. Reflective color liquid crystal display device 300 is composed of liquid crystal element 20, hologram 40 and optical path conversion element array 50. Blue pixels B, green pixels G and red pixels R are arranged in a plane in the liquid crystal element 20. Hologram 40 is arranged at a constant angle the surface of liquid crystal element 20. Optical path conversion element array 50 is disposed behind hologram 40. Optical path conversion element array 50 has the function to transform the light that is transmitted to hologram 40 into almost parallel light. Hologram 40 disperses the parallel light received from the optical path conversion element array 50 to blue light, green light and red light portions. Hologram 40 disperses the parallel light to produce a blue light portion, green light portion and red light portion. The parallel light is emitted from optical path conversion element array 50, and hologram 40 irradiates liquid crystal element 20 with the dispersed light. A blue light portion irradiates blue pixel B, a green light portion irradiates green pixel G, and a red light portion irradiates red pixel. Reference numeral 60 indicates the light directed onto the back side of optical path conversion element array 50. The difference between the transmissive color liquid crystal display device of FIG. 1 and the reflective color liquid crystal display device of FIG. 2 is that there is a reflector in the liquid crystal element 20 of the latter. Liquid crystal element 20 and hologram 40 of the former oppose each other at a constant angle.

By this structure the light that irradiates each pixel is injected into three times the area. The brightness becomes one third by dispersing the incident light. Because the area of a pixel becomes one third, the quantity of light per unit area becomes the same as the incident light, the brightness of the pixel becomes three times that of the conventional reflective type color liquid crystal display device, and a bright display screen can be realized. However, light passes two times through the color filter in the liquid crystal element 20. Therefore, when the transmissive color liquid crystal display devices of FIG. 1 and FIG. 2 are compared, the screen of FIG. 2 is seen to be a little darker. But, the brightness can be compensated by reducing the pigment concentration of the color filter, the film thickness etc. to increase the transmittance of the color filter.

Figure 3:
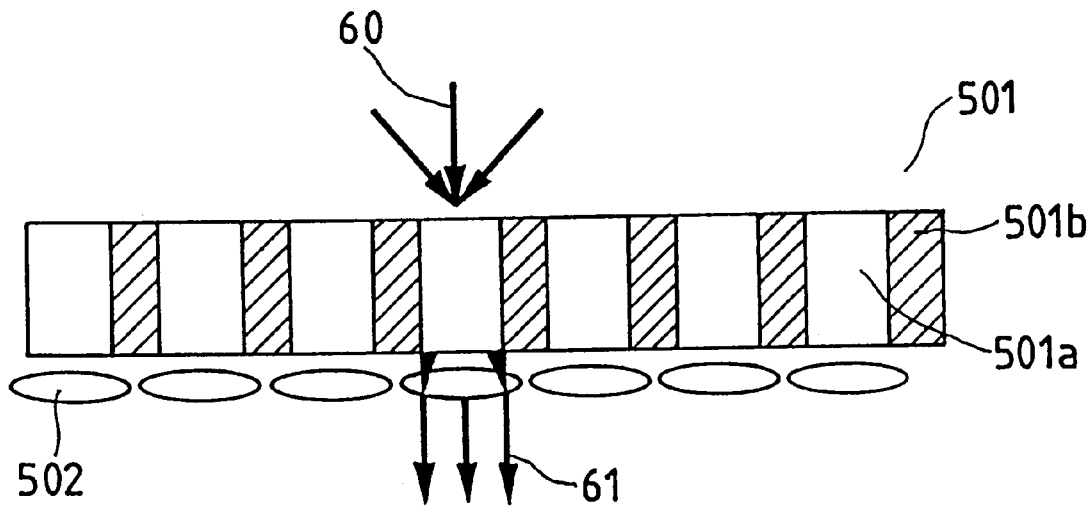
FIG. 3 is a schematic cross sectional view which shows an example of an array of photo-path conversion elements that are used for this invention.
Figure 4:
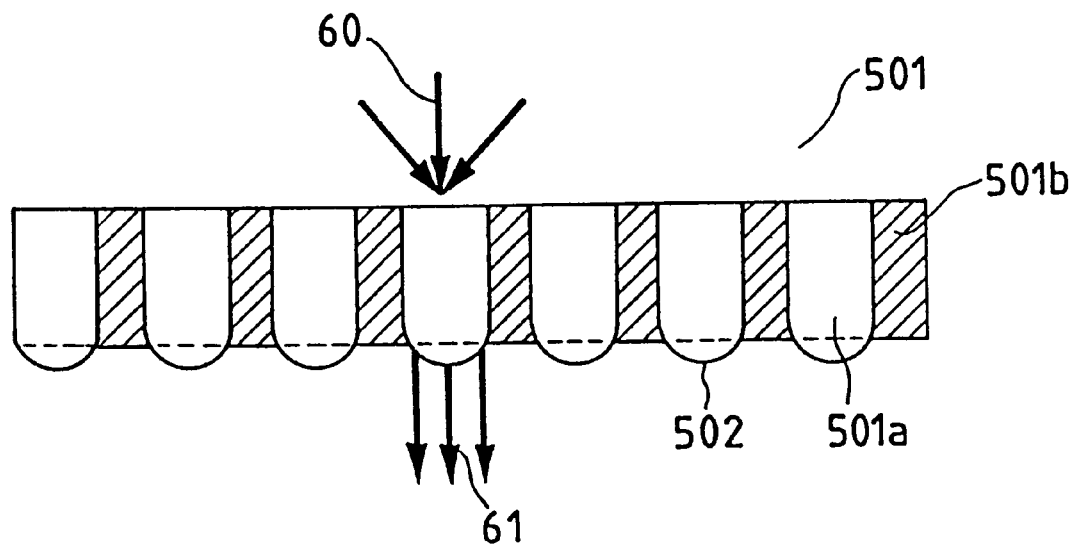
FIG. 4 is a schematic cross sectional view which shows another example of an optical path conversion element array used for this invention.

FIGS. 3 and 4 are schematic cross sectional views that show in detail the structure of the optical path conversion element array 50. Optical path conversion element array 50 is composed of fiber optic faceplate 501 and lens array 502. Fiber optic faceplate 501 comprises core 501*a* of higher refractive index that conducts light in the thickness direction and cladding 501*b* of lower refractive index that makes light reflect at the boundary surface. The sectional area of core 501*a* is a circle or a polygon. Cladding 501*b* is arranged to surround core 501*a*. Lens array 502 is separated from fiber optic faceplate 501 in the example of FIG. 3. However, the lens array is integrated with core 501*a* in the example of FIG. 4. When they are integrated, the emitting face of core 501*a* is made in a convex form, or the refractive index distribution is determined by injection of ions into the emitting side of fiber optic faceplate 501. When the numerical aperture (NA) of the fiber optic faceplate 501 is set to be 0.66 and the diameter of the core 501*a* is set to be 12 μm, the transmittance becomes 85% or more. When lens array 502 is disposed at the emitting side of fiber optic faceplate 501, a transmittance of 70% or more is also obtained. In the example, fiber optic faceplate 501 was formed out of a fiber of which the numerical aperture is 0.66 and the diameter of the core 501*a* is 12 μm. When the numerical aperture of the fiber is enlarged to 1.0, incident light can be taken in efficiently. Light 60 that is injected into fiber optic faceplate 501 is corrected to approximately parallel light 61 by the following method using the optical path conversion element array 50 shown above. Light 60 that is injected into the fiber optic faceplate 501 and passes to the inside of each core 501*a* is emitted spreadingly in a radial direction from each core. By means of lens array 502 disposed at the emitting side of each core 501*a*, approximately parallel light 61 is obtained by optical path conversion element array 50. Matching agents, such as an adhesive agent having a refractive index which is higher than the air, are inserted between lens array 502 and fiber plate 501 to reduce the numerical aperture substantially. Therefore, light emitted from core 501 can be transformed with lens array 502 into parallel light efficiently.

Figure 5:
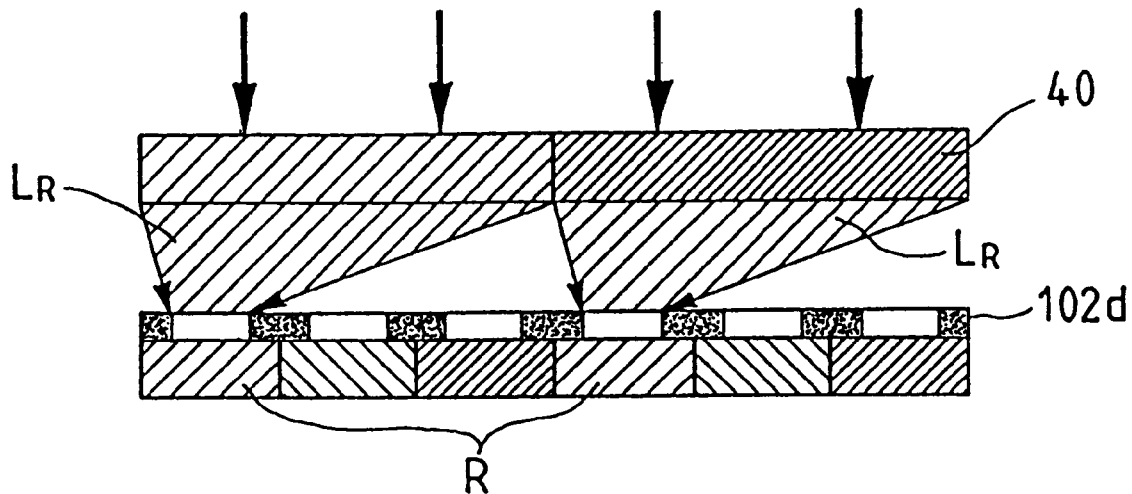
FIG. 5 is a schematic cross sectional view for explaining the function of a hologram used for the color liquid crystal display device of this invention.
Figure 6:
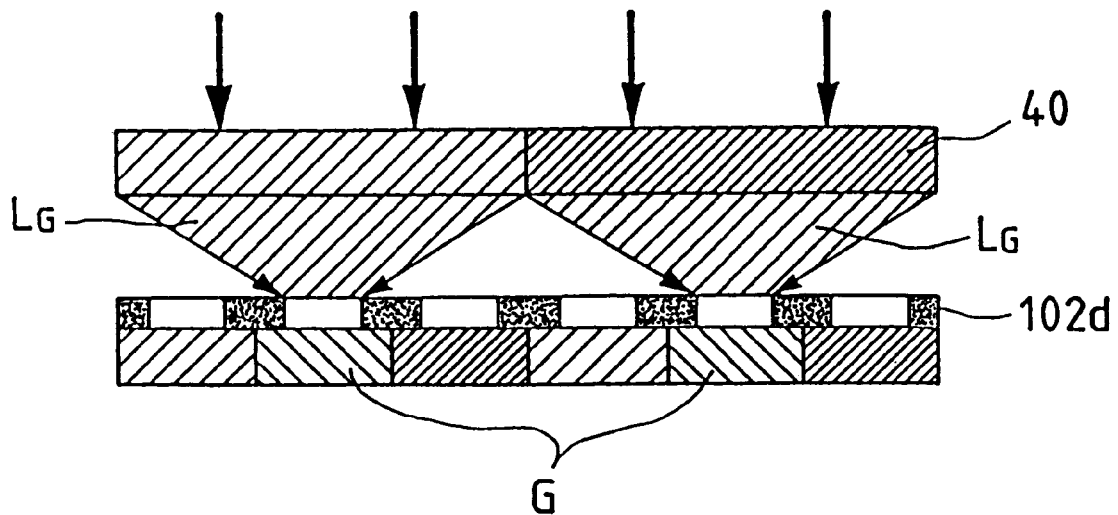
FIG. 6 is a schematic cross sectional view for explaining the function of a hologram used for the color liquid crystal display device of this invention.
Figure 7:
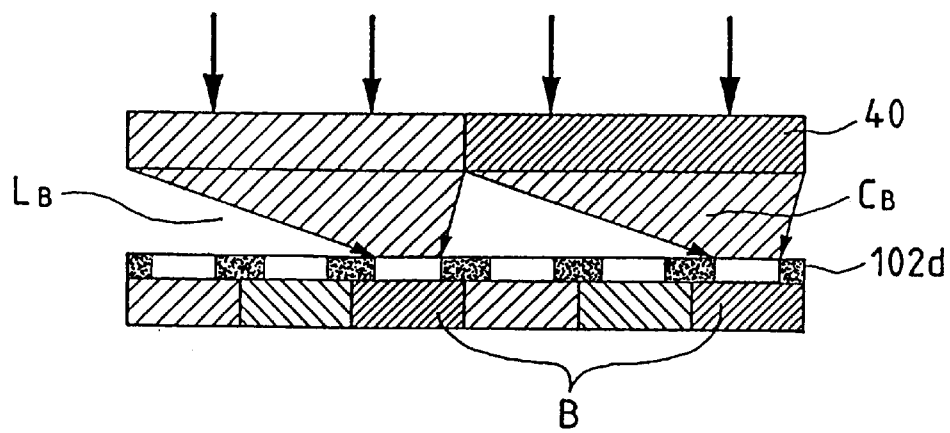
FIG. 7 is a schematic cross sectional view for explaining the function of a hologram used for the color liquid crystal display device of this invention.

FIGS. 5 to 7 are schematic cross sectional views that explain the function of hologram 40. FIG. 5 shows condensation of red light LR by hologram 40, FIG. 6 shows condensation of green light LG by hologram 40 and FIG. 7 shows condensation of blue light LB by hologram 40. Reference numeral 102*d* indicates the black matrix arranged on the boundary part of blue pixel B, green pixel G and red pixel R arranged in the plane of the liquid crystal element 10. Hologram 40 is arranged in compliance with each (pixel) group consisting of a blue pixel B, a green pixel G and a red pixel R. And, hologram 40 and each pixel stretch in a stripe form in a direction perpendicular to the face of the drawing. As can be understood, parallel light incident on hologram 40 is separated into red light LR, green light LG and blue light LB portions, and each light portion condenses on a red pixel R, a green pixel G and a blue pixel B, respectively.

There are two kinds hologram, i.e., a plane hologram and a volume hologram. The difference between the plane hologram and the volume hologram is defined by the Q value. When the Q value is larger than 10, it is called a volume hologram, and when Q is smaller than 10, it is called a plane hologram. Characteristics, such as wavelength selectivity and angular selectivity, are different. The larger the thickness of the grating of the hologram is, the larger the angular dependency of the wavelength selectivity and light becomes. Q is calculated in the following equation.

$$Q=2\pi\lambda T/nd2$$

λ shows a wavelength of the optical wave in vacuum, T shows the thickness of the hologram, n shows the refractive index, and d shows the period of the grating. A phase modulation type hologram, an amplitude modulation type hologram, a complex amplitude type modulation hologram, etc. may be employed as the plane hologram and the volume hologram. Hologram 40 is a phase modulation type hologram in FIGS. 5 to 7. That is, light 61 injected into hologram 40 is diffracted in the specific direction of the wavelength by the hologram of the refractive index modulation type in FIG. 5. Therefore, the light of the specific wavelength separates efficiently and condenses in each pixel.

Figure 10:
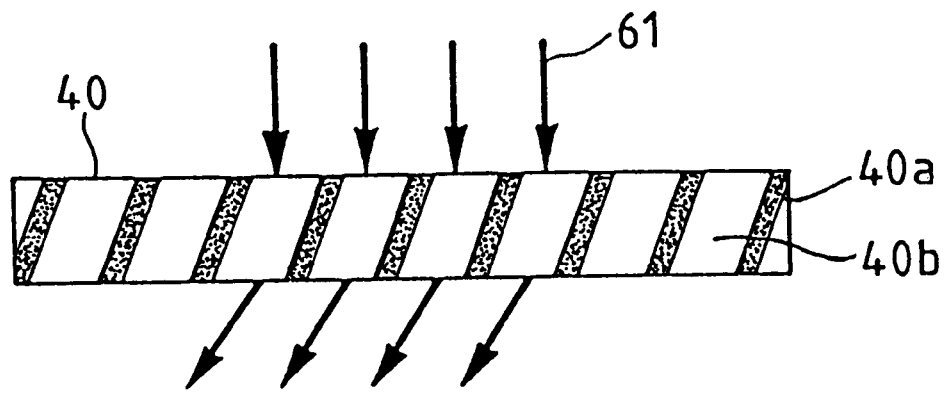
FIG. 10 shows a schematic cross sectional view of a refraction modulation type hologram used for the color liquid crystal display device of this invention.
Figure 11:
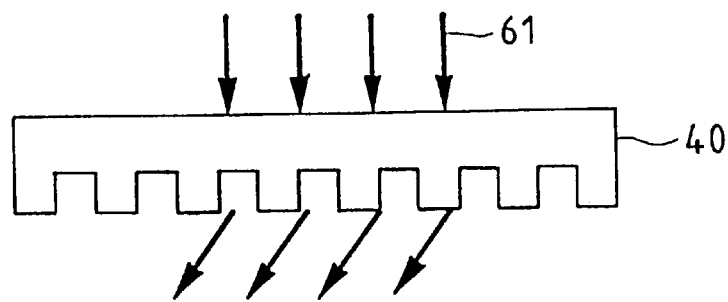
FIG. 11 shows a schematic cross sectional view of a release hologram used for the color liquid crystal display device of this invention.
Figure 12:
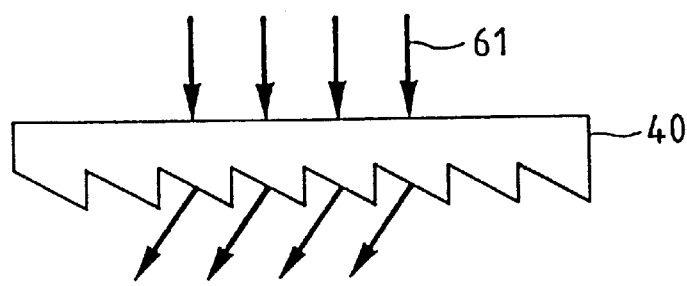
FIG. 12 is a schematic cross sectional view of a blazed hologram used for the color liquid crystal display device of this invention.

As shown in FIGS. 10 to 12, the phase modulation type hologram may be one of two kinds, a refractive index modulation type hologram (FIG. 10) and a release type hologram (FIGS. 11 and 12). In FIG. 12, there is shown a blaze type hologram that increases the diffraction efficiency of the specific direction as the release type. The refractive index modulation type hologram is composed of high refractive index part 40*a* and lower refractive index part 40*b*, as seen in FIG. 10. And, in the release hologram, as seen in FIGS. 11 and 12, a pattern of projections is formed on the hologram surface.

An example of the method of manufacturing a phase modulation type hologram 40 of the refractive index modulation type will be explained with reference to FIG. 8. Reference light LO of a specific wavelength is perpendicularly injected into the surface on one side of film 401, at an angle that takes into consideration the direction that it wants to diffract object light LM of the specific wavelength (reference light LO and coherent light), that is, by film 401. As a result, the grating of the refractive index modulation type is formed by 2 spots of light on film 401. When illuminating light Lr of the specific wavelength is injected, the illuminating light Lr is modulated and comes out in the reverse direction along with the object light LM. This operation is performed sequentially for the green light, the blue light and the red light, while the direction of the object light LM is changed. Thus, white light 61 that is parallel to manufactured hologram 40 is injected perpendicularly into the hologram 40 face. Then, as shown in FIG. 9, white light 61 is separated into red light LR, green light LG and blue light LB, in sequence, and each light comes out in a desired direction. Color display becomes possible by conforming the emitting directions of the red light LR, green light LG and blue light LB with the positions of the red pixel R, green pixel G and blue pixel B. In this invention, optical path conversion element array 50 makes the light entering hologram 40 approximately parallel light, so that the diffraction efficiency of the hologram 40 is improved, and a bright screen is realized.

In this invention, the hologram was prepared by multiplex exposure, however it is possible to disperse the light into three light portions by dividing the wave length of the hologram. If it can be prepared by one exposure, a reduction in cost and an increase in yield can be expected.

Figure 8:
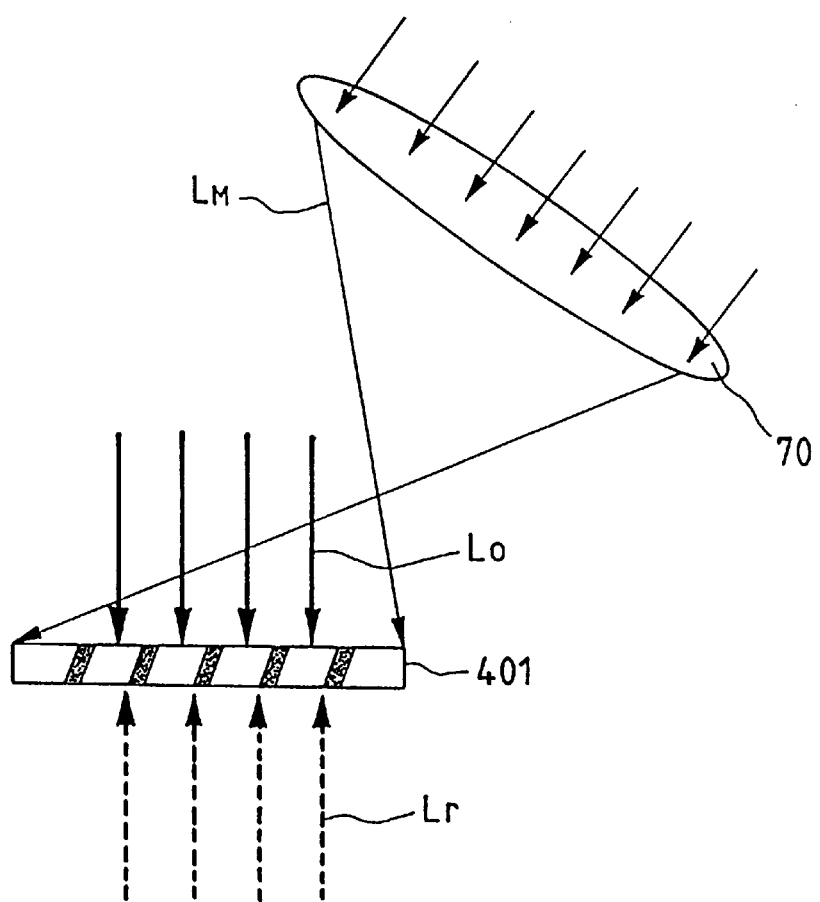
FIG. 8 is a diagram for explaining the method of manufacturing a hologram used for the color liquid crystal display device of this invention.
Figure 9:
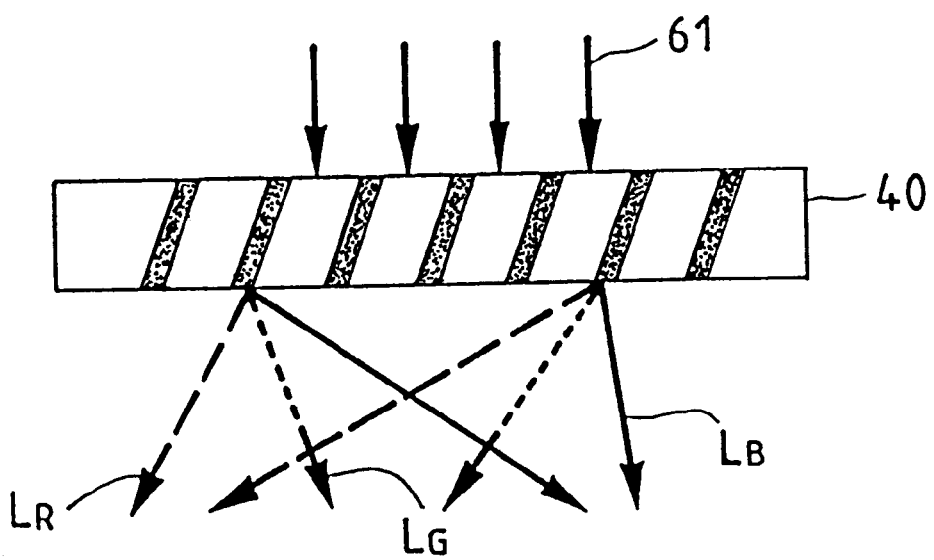
FIG. 9 is a schematic cross sectional view for explaining the function of a hologram used for the color liquid crystal display device of this invention.

In the method shown in FIG. 8, the release hologram uses the photo resistance as film 401, and red light LR, green light LG and blue light LB are sequentially emitted. The release hologram can be formed by etching. The blazed hologram can be manufactured by embossing a metal mold to improve the efficiency by specifying the directionality of the diffraction light.

The amplitude modulation type hologram can be formed by a similar method to that shown in FIG. 8, where a photosensitive material of halogenated silver is used.

And, as a hologram material other than those mentioned above, a refractive index modulation type, release type and amplitude modulation type can be used. The amorphous semiconductor, the electro-optical crystals and the feroelectric liquid crystal are examples of materials for a refractive index modulation type hologram. There is a thermoplastic film which may be used as a material for the release type hologram. There are a photochromic material, a dichromic acid gelatin and a magnetic optical material for use in an amplitude modulation type hologram.

Using the above described hologram techniques, the volume hologram and the plane hologram can also be manufactured. However, as for the volume hologram, the wavelength selectivity and the angular selectivity are larger than those of the plane hologram. Therefore, when the volume hologram is used for the liquid crystal display device, high color purity is gained in the display.

Figure 13:
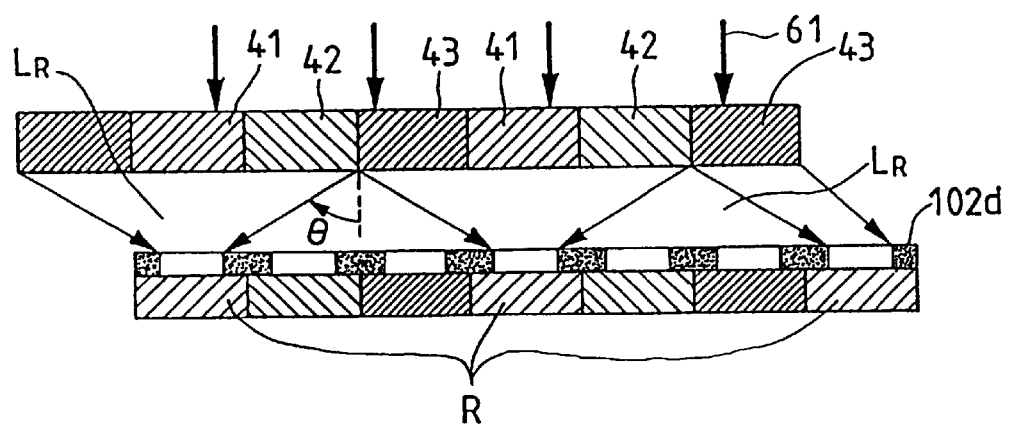
FIG. 13 is a schematic cross sectional view for explaining the function of another type of hologram used for the color liquid crystal display device of this invention.
Figure 14:
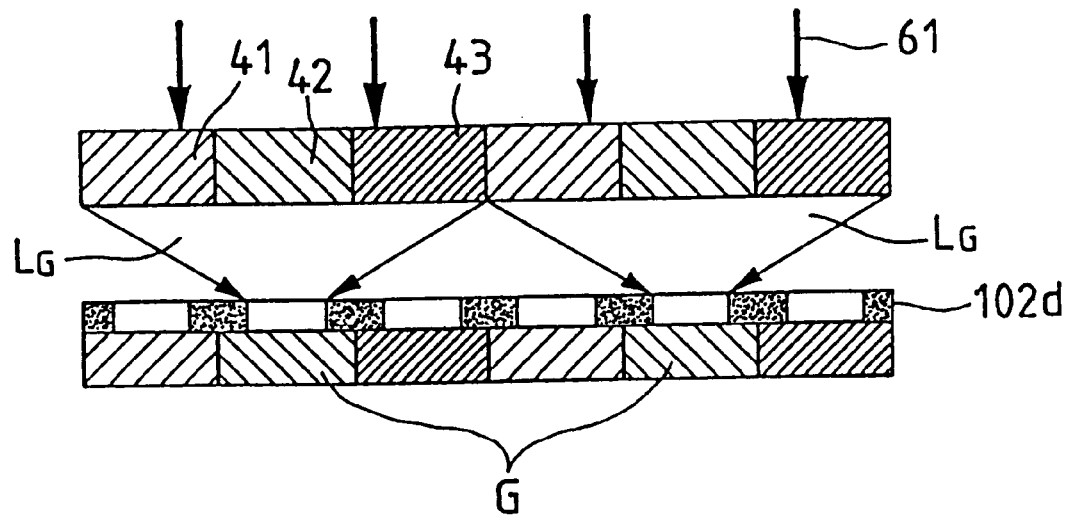
FIG. 14 is a schematic cross sectional view for explaining the function of another type of hologram used for the color liquid crystal display device of this invention.
Figure 15:
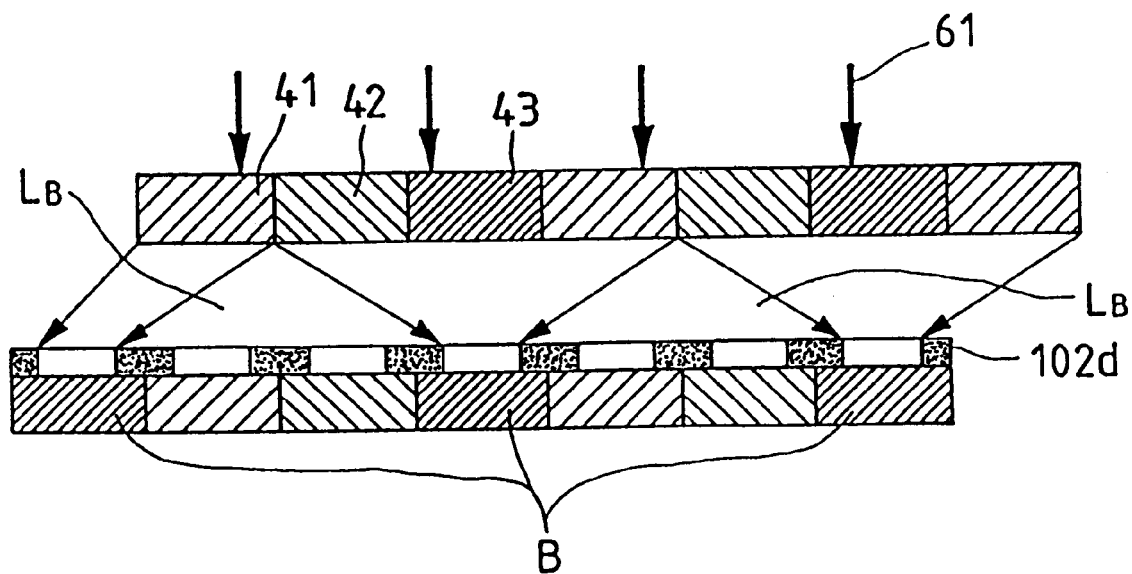
FIG. 15 is a schematic cross sectional view for explaining the function of another type of hologram used for the color liquid crystal display device of this invention.

FIGS. 13 to 15 are examples that show the response of the hologram 40 and each pixel. In this example, it is a feature of this example that the size of the hologram is one third of the size of the hologram shown by FIGS. 5 to 7. Three kinds of holograms 41, 42 and 43 are prepared by matching the width of each pixel and the width of each hologram. Each hologram 41, 42 and 43 disperses injected parallel light 61 into blue light LB, green light LG and red light LR portions. Then, these holograms irradiate blue light LB to a blue pixel B, green light LG to a green pixel G and red light LR to a red pixel R.

Each pixel is irradiated with the light that comes out from the holograms at a position that corresponds to each pixel. For example, red pixel R is irradiated with the light from hologram 41 and is also irradiated with holograms 42, 43 that are placed at corresponding positions. As a result, the diffraction angle θ of the light that comes out from the hologram can be made small in comparison with the case of the example shown in FIGS. 5 to 7. When the diffraction efficiency enlarges, there is a tendency that the diffraction angle θ will become small in the actual hologram. In this example, because the diffraction angle of the hologram can be made small, it is possible to obtain a diffraction efficiency that is close to a theoretical value, and so it is possible to obtain a bright image.

Figure 16:
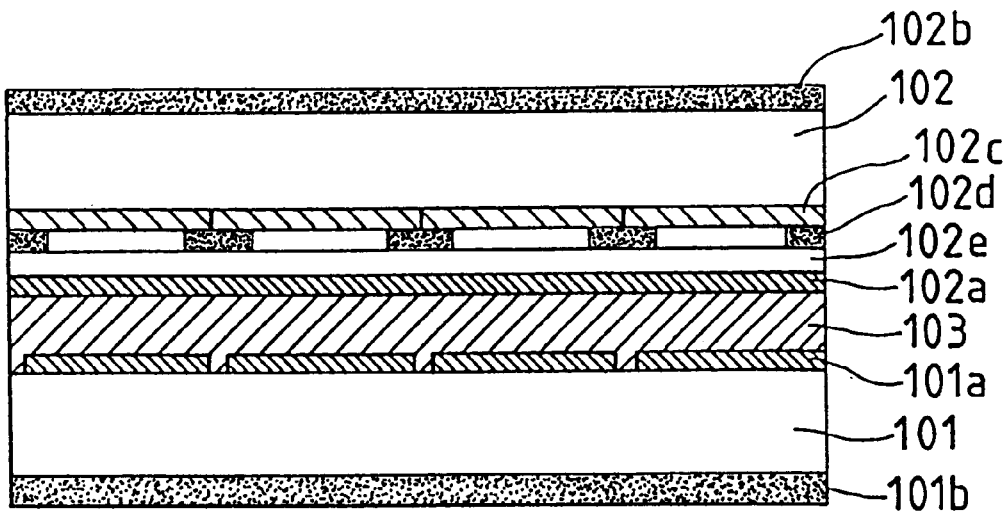
FIG. 16 is a schematic cross sectional view which shows an example of a liquid crystal display element used for the transmissive color liquid crystal display device of this invention.
Figure 17:
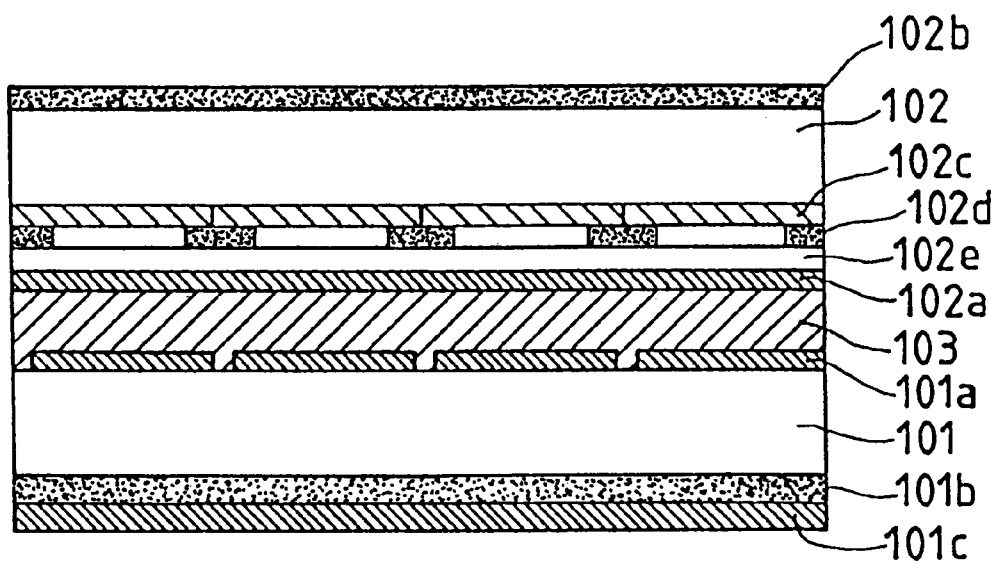
FIG. 17 is a schematic cross sectional view which shows an example of a liquid crystal display element used for the reflective color liquid crystal display device of this invention.

FIGS. 16 and 17 are examples that show liquid crystal element 10 used in FIGS. 1 and 2. In FIG. 16 101 is a first transparent glass substrate. Transparent electrode 101a is formed on the face on one side and polarizer 101b is formed on the other face of the glass substrate 101. A second transparent glass substrate 102 is also provided. Black matrix 102d, protection film 102e and transparent electrode 102a are formed on the boundary of color filter 102c, which is formed on the face on the one side of glass substrate 102, while polarizer 102b is formed on the other face of the glass substrate 102. Liquid crystal layer 103 is sandwiched between the pair of transparent glass substrates 101 and 102, arranged with a specified gap, so as to abut the transparent electrodes. FIG. 16 illustrates the transmissive color liquid crystal display element having the above mentioned structure. The back light is directed toward the side of second transparent glass substrate 102. FIG. 17 illustrates a reflective color liquid crystal display element, which is formed by disposing a diffusing reflector 101c on polarizer 101b of first transparent glass substrate 101. An image display is performed by applying a voltage, which is determined by an image signal, between the transparent electrodes and by controlling the incident light. That is, red, green and blue elements are arranged so that a color filter is formed in one plane and transmitting light is controlled for every pixel to obtain a color display. Blue pixel B, green pixel G and red pixel R are composed of at least color filters for blue, green, red light and a liquid crystal layer that is superposed on the color filters and transparent electrodes on both sides of the liquid crystal.

In this example, the liquid crystal element is provided with color filter 102c. Since light is dispersed by using a hologram, the color filter is not necessary. And, while polarizers 101b and 102b are arranged outside transparent glass substrates 101, 102, they also can be arranged inside the transparent glass substrates. In addition, reflector 101c in FIG. 17 also can be arranged inside of the transparent substrate 101 in case polarizer 101b is outside the substrate 101. Polarizer 101b and polarizer 102b are needed for the liquid crystal layer 103, because it is a twisted nematic liquid crystal. But when using a polymer dispersed liquid crystal, etc. not using the polarization of light, these polarizers are unnecessary. Any liquid crystals, such as feroelectric liquid crystal, smectic and cololesteric LC, can be used as well as nematic liquid crystal, such as homogenous, homeotropic and the super twisted nematic liquid crystal, as liquid crystal layer 103.

Figure 18:
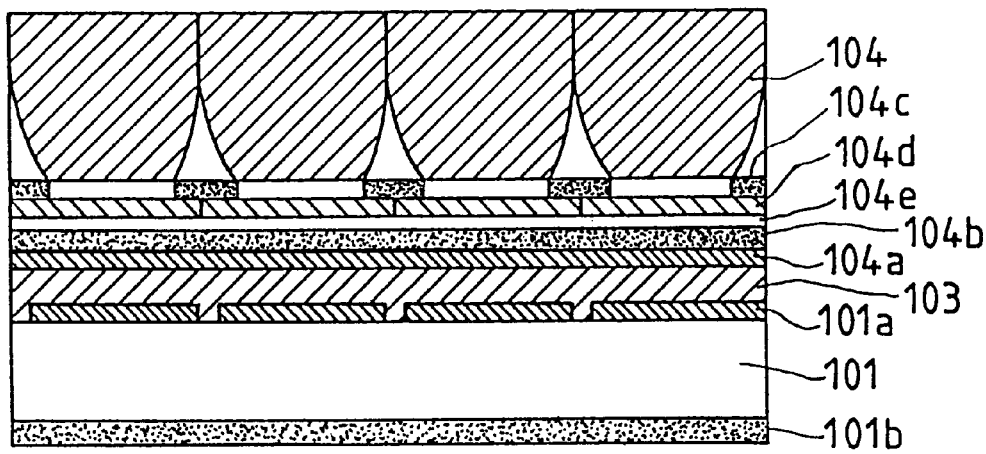
FIG. 18 is a schematic cross sectional view which shows an example of a liquid crystal display element used for the color liquid crystal display device of this invention.
Figure 19:
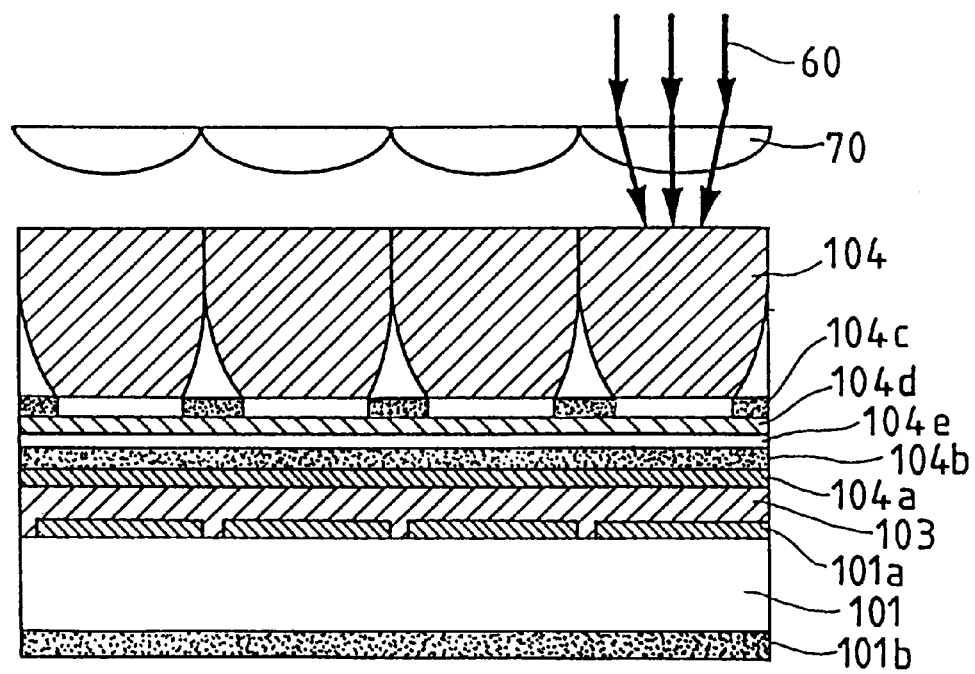
FIG. 19 is a schematic cross sectional view which shows another example of a liquid crystal display element used for the color liquid crystal display device of this invention.

FIGS. 18 and 19 are examples of a liquid crystal element 10 that is used for this invention.

In FIG. 18, the first transparent glass substrate 101 and the liquid crystal layer 103 are the same as FIG. 16. The fiber optic faceplate 104 consists of a bundle of optical fibers. A color filter 104c is arranged in correspondence to each optical fiber of the fiber optic faceplate 104. A black matrix 104d is arranged at the boundary of the fiber optic faceplate 104 and the color filter 104c. A protection film 104e is provided on the color filter 104c. A polarizer 104b is provided on the protection film. A transparent electrode 104a is provided on the polarizer. Each optical fiber that forms a part of the core portion of the fiber optic faceplate 104 corresponds to a respective pixel, and the fiber becomes thinner as it approaches the color filter 104c. The core portion does not need to be one optical fiber. A core portion is acceptable when the bundle of fibers is made thinner in the direction from the incident side to the emitting side. The figure illustrates the use of a transmissive color liquid crystal display element. A reflective color liquid crystal display element may be formed by arranging a specular reflector on polarizer 101b.

FIG. 19 illustrates a structure in which a rod lens 70 is arranged above the fiber optic faceplate 104 of the liquid crystal element shown in FIG. 18. This structure brings about the following effects. External light or incident light 60, that is, the diffused light from the over surface, can inject into the core portion of the fiber optic faceplate 104 efficiently by means of the rod lens 70. A reflective color liquid crystal display element can be formed by arranging a specular reflector on polarizer 101b in this case.

The incident light to the liquid crystal can be used by the structure shown in FIGS. 18 and 19 without depending on the aperture ratio of the pixel part. The closer to 1 the numerical aperture of the fiber is, the more light is taken in. The light injected in the fiber is reflected at the boundary surface of the fiber, and it condenses efficiently in the pixel part. Because of the arrangement of the fiber optic faceplate 104, there is no reflection of the image, therefore, the reflectance is increased by the reflection plane of the mirror surface. The liquid crystal element of this structure is applied to the color liquid crystal display device of FIGS. 1 and 2. Light dispersed by the hologram can be projected on the pixel part efficiently, and a bright color display is achieved. Lightness could be improved to 1.8 times in comparison with the conventional liquid crystal display element having an aperture ratio of 50% applied to FIGS. 1 and 2. In this example, the color filter is not always necessary. When a hologram having a strong wavelength selectivity is used, it is not necessary to provide the color filter. Color purity is increased by using the color filter in combination with a hologram whose wavelength selectivity is weak. In this example, light condenses in the pixel part due to the fiber. Therefore, it is not necessary to consider the problem of aperture ratio. When applied to a TFT-LCD device, the wiring width and the size of the transistor are made larger, and the design margin as well as the design, or the built-in type of redundancy circuit, etc. is enabled.

Figure 20:
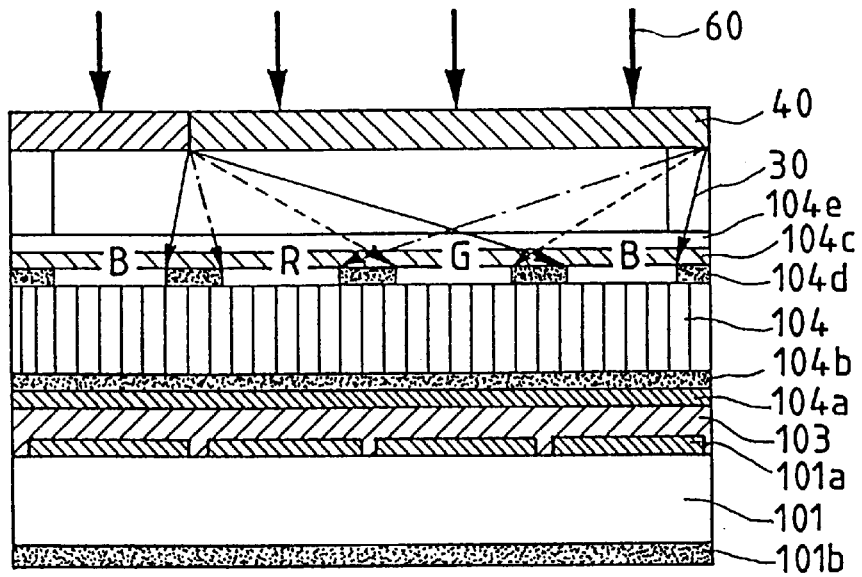
FIG. 20 is a schematic cross sectional view which shows an example where a liquid crystal display element and a hologram are integrated for use in the transmissive color liquid crystal display device of this invention.
Figure 21:
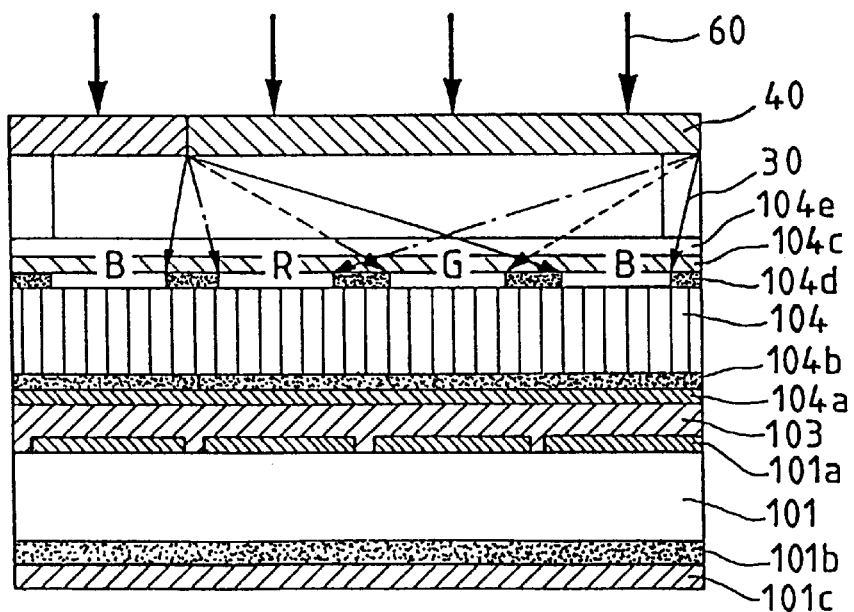
FIG. 21 is a schematic outline cross sectional view which shows another example where a liquid crystal display element and a hologram are integrated for use in the transmissive color liquid crystal display device of this invention.
Figure 22:
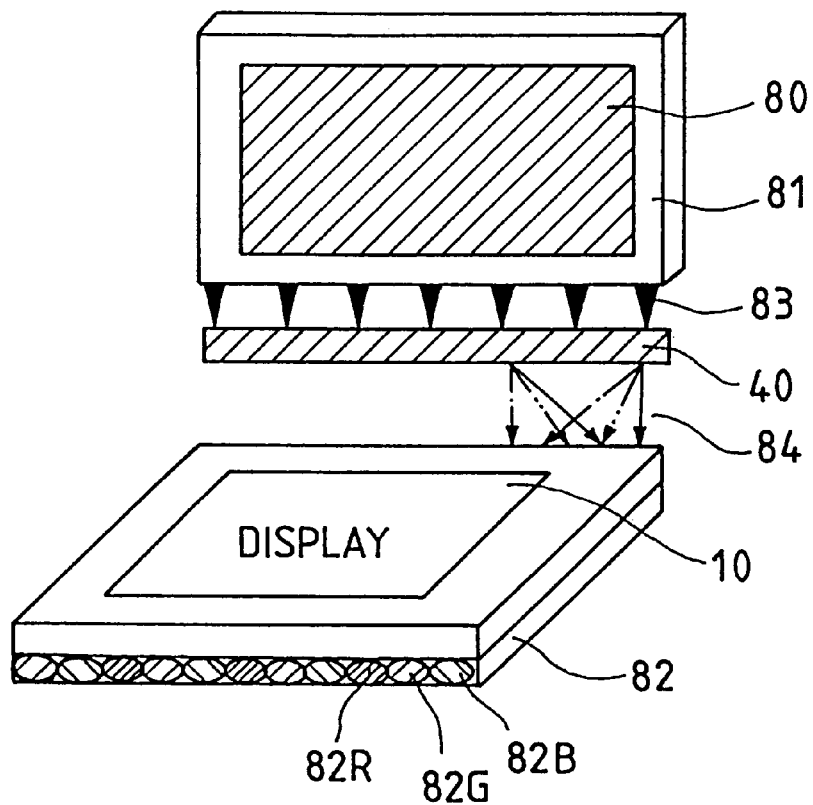
FIG. 22 is a perspective view which shows another example of the color liquid crystal display device of this invention.

FIGS. 20 and 21 are the sectional views that illustrate in detail the structure for integrating the liquid crystal element shown in FIGS. 1 and 2 with a holograph. FIG. 20 shows a transmissive color liquid crystal display device, and FIG. 21 shows a reflective type color liquid crystal display device. When compared with the liquid crystal element shown in FIG. 18, the liquid crystal element shown in FIGS. 20 and 21 is different in the following two points: (1) fiber optic faceplate 104 is arranged between black matrix 104d and transparent electrode 104a; and (2) protection film 104e is positioned outside the color filter 104c. Reference numerals 30 and 40 represent the spacer and the hologram, respectively. FIG. 21 shows the device shown in FIG. 20 to which a specular reflector 101c is added. In these examples, there are used a 90 degree twisted nematic liquid crystal layer for liquid crystal layer 103, and a fiber optic faceplate 104 having a core diameter of 12 µm, a numerical aperture of 0.66 and a thickness of 1.1 mm. When using a nematic liquid crystal, a polarizer is necessary. When a liquid crystal layer, such as a polymer dispersed liquid crystal display, that does not require the polarization of light, is provided as a liquid crystal layer, the polarizer is not needed. The feroelectric liquid crystal, smectic liquid crystal, etc. can be used as well as a nematic liquid crystal as the liquid crystal layer 103. The color filter 104c and black matrix 104d can be arranged on either side of the substrate, and the order of the arrangement is not limited. The positions of the color filter 104c, black matrix 104d, etc. are not limited to being outside of the substrate. The black matrix 104d and color filter 104c can be disposed inside of the substrate like a conventional color liquid crystal display device. There are a substrate of hologram, shown in FIGS. 5 to 7, and three kinds of hologram, shown in FIGS. 13 to 15. Especially, as for the former structure, the hologram can be manufactured as only one kind at low cost. And, loss due to an adjustment deviation with respect to the position at which the light from the pixel and the hologram condenses also can be reduced.

The light dispersed by hologram 40 is projected on each pixel R, G and B by the above structure. The light which comes from the oblique direction for each pixel is conducted in the thickness direction of the fiber optic faceplate 104, and it directed approximately perpendicular to polarizer 104b and liquid crystal layer 103. As a result, cross-talk between pixels and the viewing angle dependence of the liquid crystal and the polarizer are reduced. And, use of the fiber optic faceplate 104 improves the color purity.

Figure 23:
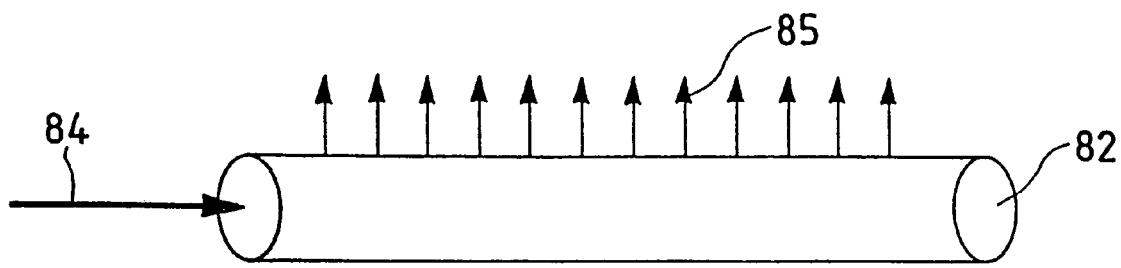
FIG. 23 is a schematic diagram showing an example of the waveguide which is applied to the color liquid crystal display device of FIG. 22.
Figure 24:
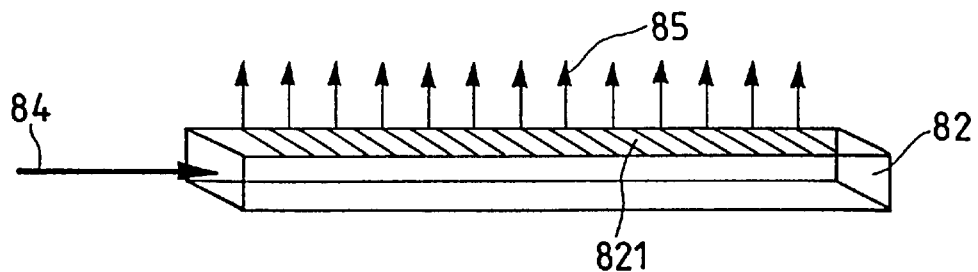
FIG. 24 is a schematic diagram showing another example of the waveguide which is applied to the color liquid crystal display device of FIG. 22.

FIGS. 22 to 25 show an example of the color liquid crystal display device. This example relates to a color liquid crystal display device of low power consumption, light weight and bright display, without using a back light, but by introduction of an external light. The detector 80 receives light from the outside in the structure. The light from detector 80 is transformed into parallel light 83 by condensing plate 81, and the light enters hologram 40. The means for making light parallel and the hologram have been described the above example. Emitted light 84 from hologram 40 is dispersed light portions for blue, green and red colors. Each light portion is directed to green light waveguide 82 G, blue light waveguide 82B and red light waveguide 82 R. Either a fiber or a thin film waveguide can be used as these waveguide. Light guided by each waveguide is emitted from the lower face of liquid crystal element 10 upwardly toward the display part so as to be irradiated uniformly. Waveguides 82B, 82G and 82R are aligned with pixels R, G and B of the liquid crystal elements, so external light is used with high efficiency. The structure of the waveguide shown in FIG. 23 or FIG. 24 is used so that light 85 emitted from the waveguide to the liquid crystal element 10 illuminates the display part of the liquid crystal element 10 uniformly. In FIG. 23, the fiber is used as a waveguide 82. The impurity concentration in the waveguide is increased from the incident side to emitting side. As a result, a uniform quantity of emitted light 85 is obtained irrespective of the position of the waveguide. On the other hand, grating 821 is formed on the top surface of waveguide 82, the liquid crystal element 10 side in FIG. 24. As a result, the light which propagated in waveguide 82 comes out as light 85, due to the grating 821, toward the liquid crystal element 10.

Figure 25:
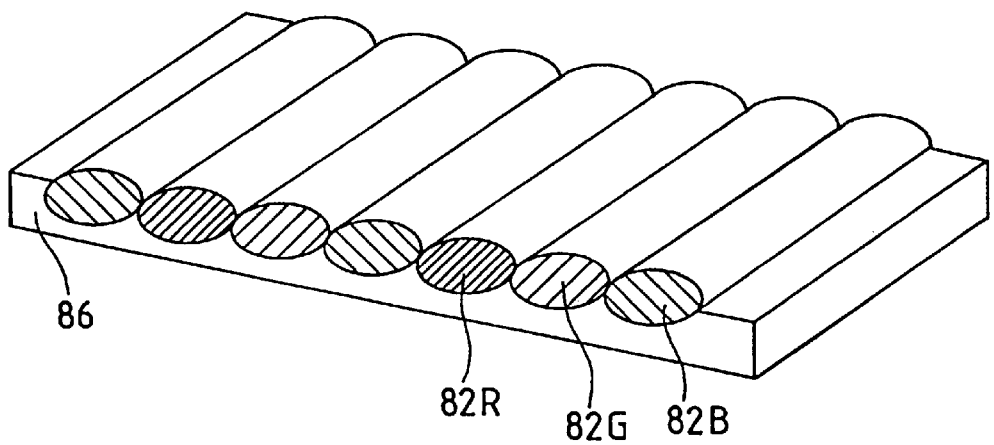
FIG. 25 is a schematic cross sectional view showing another example of the waveguide which is applied to the color liquid crystal display device of FIG. 22.
Figure 26:
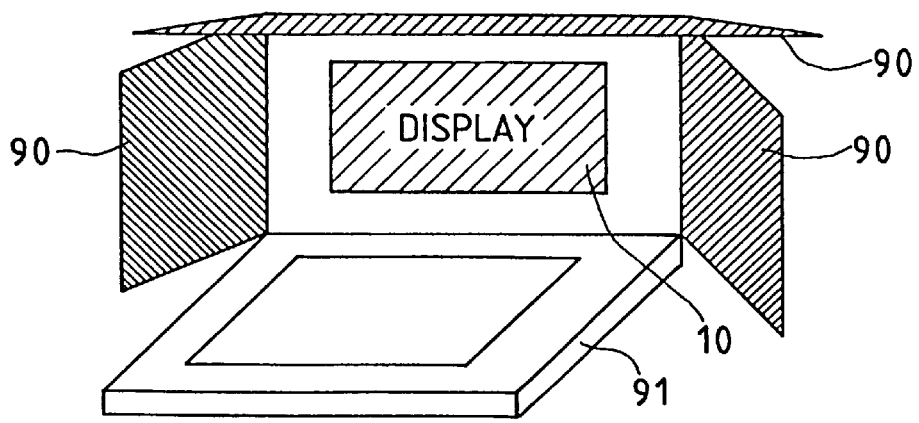
FIG. 26 is a perspective view which shows an example of the color liquid crystal display device of this invention.
Figure 27:
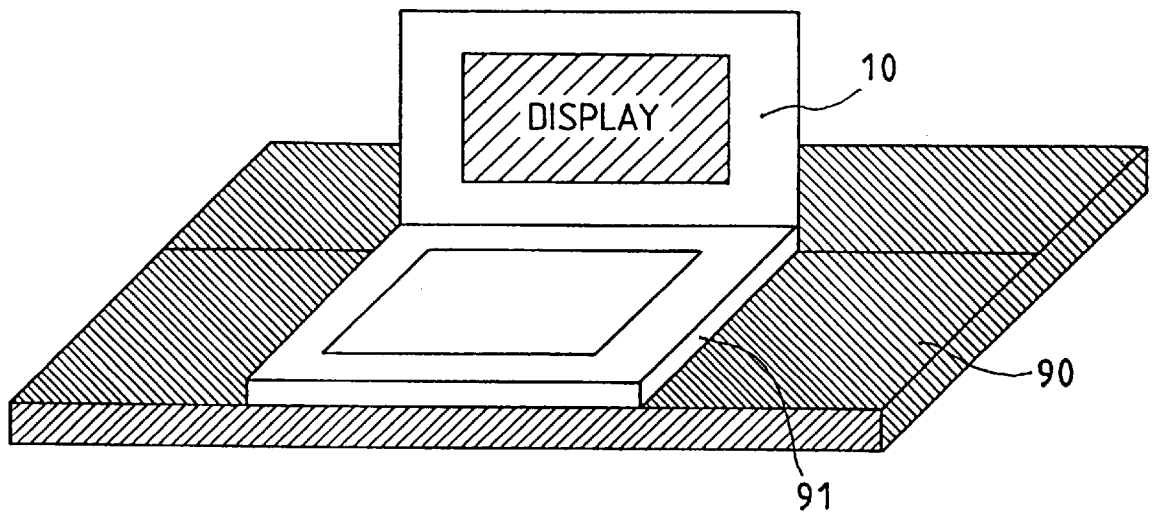
FIG. 27 is a perspective view which shows other example of the color liquid crystal display device of this invention
Figure 28:
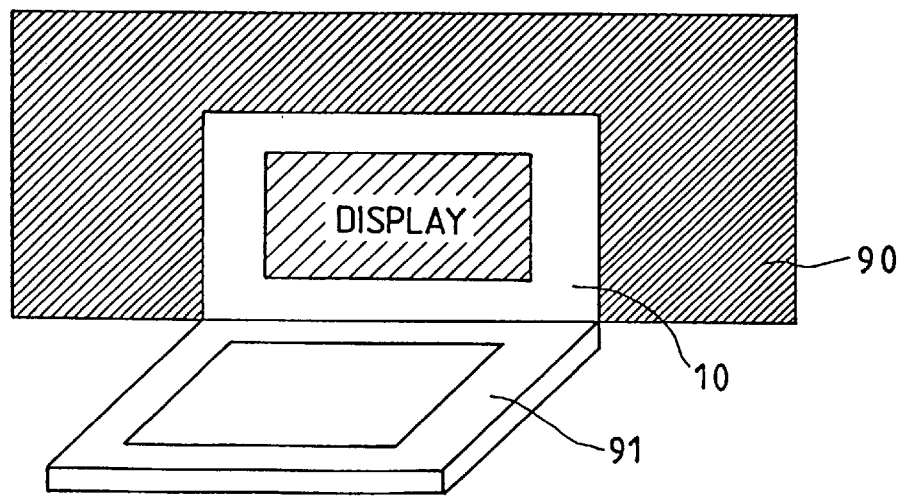
FIG. 28 is a perspective view which shows another example of the color liquid crystal display device of this invention.
Figure 29:
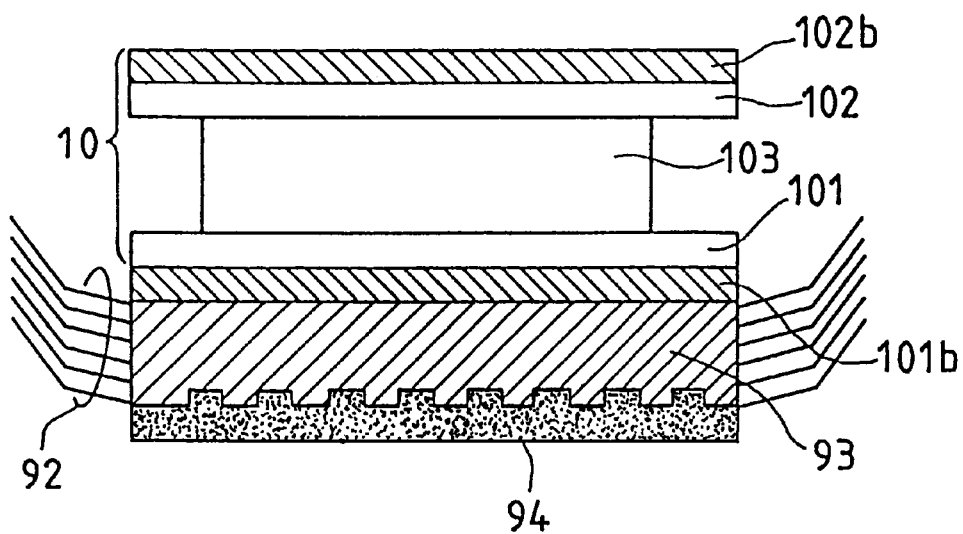
FIG. 29 is a schematic cross sectional view which shows a different example of the color liquid crystal display device of this invention.
Figure 30:
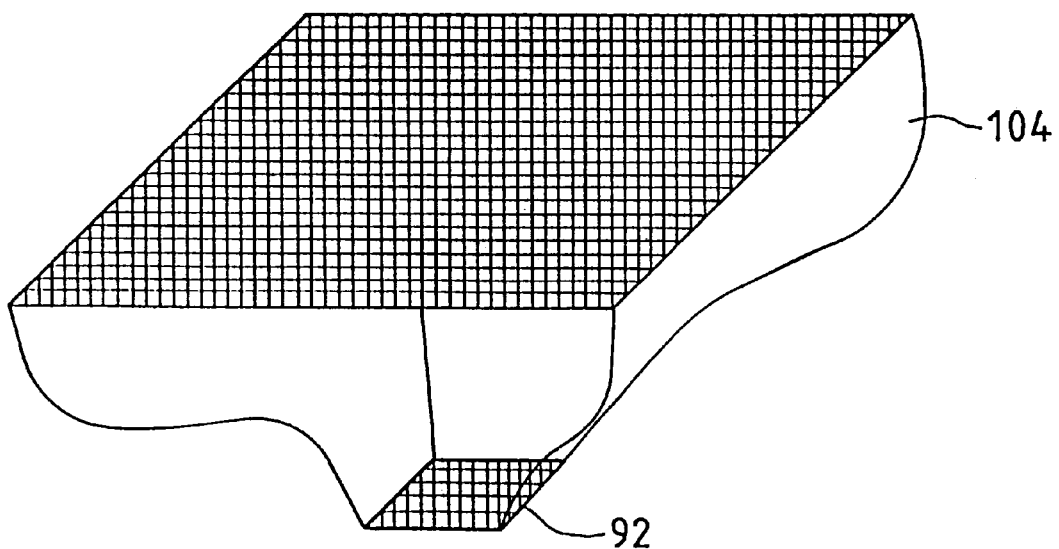
FIG. 30 is a perspective view showing the construction of the fiber plate used for the color liquid crystal display device shown in FIG. 29.

In FIGS. 23 and 24, if a visual light absorption agent 86, shown in FIG. 25, is arranged at a side face of the red light waveguide 82R, blue light waveguide 82B and green light waveguide 82G, color mixing with other adjoining colors can be avoided. By the arrangement of the visible light absorber 86, light leaking from each waveguide 82 does not cause mixing of colors, and so clear light 85 is emitted from waveguide 85 toward liquid crystal element n Therefore, a color liquid crystal display device using the external light of FIG. 22 comprises a means for emitting light uniformly, as described in FIG. 23 or 24. It is desirable that the visual light absorption agent 86 of FIG. 25 be arranged on the side face. Therefore, a uniform light color display can be realized.

What is claimed is;:

1. A reflective color liquid display device, comprising:
a liquid crystal display element including a liquid crystal layer, a pair of transparent electrodes arranged to form a plurality of pixels and a reflector formed on one of said electrodes at the side thereof opposite the liquid crystal layer, first means for converting light into approximately parallel light, and second means for separating the parallel light into three portions and for irradiating each of said pixels with the separated light portions, wherein said first means has a plate form and comprises a plurality of core portions having a high refractive index, a cladding portion surrounding each of said core portions and a lens disposed at an output of each of said core portions.

2. A reflective color liquid display device, comprising:

a liquid crystal display element including a liquid crystal layer, a pair of transparent electrodes arranged to form a plurality of pixels and a reflector formed on one of said electrodes at the side thereof opposite the liquid crystal layer, first means for converting light into approximately parallel light, and second means for separating the parallel light into three portions and for irradiating each of said pixels with the separated light portions, wherein said second means is formed of a hologram.

3. The reflective color liquid crystal display device as defined in claim 2, wherein said hologram is arranged at positions corresponding to each pixel of said liquid crystal display element.

4. The reflective color liquid crystal display device as defined in claim 2, wherein said hologram is arranged as a plurality of respective holograms for each color pixel which forms said pixels.

* * * * *